United States Patent

[11] 3,627,839

| [72] | Inventor | Edwin J. Vandenberg<br>Wilmington, Del. |
|---|---|---|
| [21] | Appl. No. | 779,232 |
| [22] | Filed | Nov. 26, 1968 |
| [45] | Patented | Dec. 14, 1971 |
| [73] | Assignee | Hercules Incorporated<br>Wilmington, Del. |

[54] GRAFT POLYMER OF ETHYLENICALLY UNSATURATED MONOMER ONTO A HALO-SUBSTITUTED BRANCHED POLYETHER POLYMER, AND PROCESS FOR MAKING IT
14 Claims, No Drawings

[52] U.S. Cl. ................................................. 260/874,
260/33.8 UA, 260/875, 260/881, 260/884,
260/885, 260/886, 260/887, 260/897 M, 260/898,
260/899, 260/900, 260/901
[51] Int. Cl. ........................................................ C08f 29/12
[50] Field of Search ............................................ 260/899,
901, 874, 898

[56] References Cited
UNITED STATES PATENTS
3,398,074  8/1968  Eguchi .......................... 204/159.15

Primary Examiner—Murray Tillman
Assistant Examiner—J. Seibert
Attorney—Eleanor R. Bartholomew ABSTRACT: Disclosed is a branched polyether polymer modified by a graft to at least one branch, composed of at least one free radically polymerizable ethylenically unsaturated monomer unit and usually a polymer of free radically polymerizable ethylenically unsaturated monomer material. The graft polymer is made by effecting reaction of (1) a branched polyether polymer with at least one branch being reactive halo-substituted, and (2) free radically polymerizable ethylenically unsaturated monomer material by means of a catalyst comprising a transition metal-labile ligand complex with the transition metal portion of the complex being in a valence state less than its maximum valence state, preferably in the zero valence state.

GRAFT POLYMER OF ETHYLENICALLY UNSATURATED MONOMER ONTO A HALO-SUBSTITUTED BRANCHED POLYETHER POLYMER, AND PROCESS FOR MAKING IT

This invention relates to polymers and more particularly to graft polymers.

In summary, this invention in one aspect comprises a branched polyether polymer modified by a graft composed of at least one free radically polymerizable ethylenically unsaturated monomer unit, which unit hereinafter is referred to as a graft monomer unit.

A polyether polymer is a polymer characterized by a chain or backbone of recurring monomer units having an oxygen-carbon skeletal structure according to the formula (I):

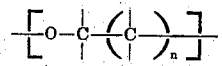

wherein $n$ broadly is 0–9 and usually 0–4. A branched polyether polymer is a polyether polymer wherein at least one of the carbon atoms in the chain, and usually more than one carbon atom, is chemically attached to one or more branch radicals selected from the group of radicals having the hydrocarbon, hydrocarbon-oxy, hydrocarbon-oxy-hydrocarbon skeletal structures. Each such radical is a branch, and in this invention at least one branch of the branched polyether polymer is chemically attached by a carbon to carbon bond to at least one graft monomer unit. Radicals selected from the group of hydrogen and halo radicals satisfy any remaining valences or bonds of the carbon atoms in the chain and in each branch. Usually the terminal oxygen atom of the polymer is bonded to a hydrogen atom. In some embodiments of this invention the branched polyether polymer without the graft is a homopolymer, only one recurring monomer unit being present. In other embodiments it is copolymer (considered in its broad sense), in some instances being a copolymer (considered in its narrow sense), two different, at least one branched, recurring monomer units according to the above formula being present, in other instances a interpolymer, etc. Some of these copolymers are of the block polymer type while others are of the random polymer type. In several embodiments the polyether polymer without the graft is crystalline; in other embodiments it is amorphous. Further discussion of the polyether polymer is set forth hereinafter relative to the process aspect of this invention.

A graft monomer unit according to this invention is characterized by a carbon skeletal structure according to the formula (II):

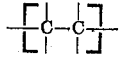

Its origin is an ethylenically unsaturated organic compound or monomer that can be polymerized by a free radical mechanism. Further discussion of the graft monomer unit and corresponding monomers appears hereinafter in the discussion of the process aspect of this invention.

While under the broader concepts of this invention the graft need be composed of only one graft monomer unit, in preferred embodiments of the graft polymer of this invention, the graft is composed of more than one graft monomer unit. In some of these embodiments the units are individually attached by carbon to carbon bonds to different branches of the polyether polymer. In other ones of these embodiments the units are individually attached by carbon to carbon bonds to different carbon atoms in one branch of the polyether polymer, where more than one carbon atom is present in the branch. In still other ones of these embodiments the units are individually attached by carbon to carbon bonds to the same carbon atom in a branch of the polyether polymer. Usually in these embodiments the units are terminated by hydrogen atoms or the like. In still other ones of these embodiments the units are chemically attached by carbon to carbon bonds to one another to form one or more polymer chains, each of which is chemically attached by a carbon to carbon bond to one or more carbon atom in one or more branches of the polyether polymer, and usually terminated with hydrogen atoms or the like. Yet other ones of these embodiments are based on all of the combinations of these structures. In some of these preferred embodiments the units are the same. In others of these preferred embodiments the units are different.

Under the broad concepts of this invention the graft portion of the graft polymer can comprise any number of graft monomer units. Usually, however, the number of such monomer units present in the graft portion of the polymer is broadly in a range from about one to about 100,000 per 200 monomer units in the polyether polymer portion, preferably in a range from about one to about 10,000 per 200 monomer units in the polyether polymer portion, and in some preferred embodiments in a range from about five to about 500 units per 200 monomer units in the polyether polymer portion.

The graft polymer of this invention in general is normally solid, specific embodiments thereof ranging from soft to very tough rubbers to hard tough rigid solids. TIn general, it is thermoplastic in the sense of being thermally formable. Some specific embodiments of it are insoluble in water, while other specific embodiments are at least water dispersible and still other specific embodiments are water-soluble. In some cases, the polymer of this invention is in soluble in liquids such as heptane and the like, and soluble in liquids such as benzene and the like.

The graft polymer of this invention has a wide variety of uses, depending on the polyether portion and the graft portion of the polymer. In general, specific embodiments of the polymer of this invention have utility as materials of construction for film, sheets, fibers, rods, tubes, bars, and other shaped articles, coatings, adhesives, vulcanized elastomers and elastic fibers. Specific embodiments of the graft polymer, that are water-soluble or water dispersible, are useful as dispersing agents, protective colloids, binders, thickeners, textile sizes, paper additives (for wet strength, dry strength, coating adhesion, and the like), and flocculating agents.

In these uses, the graft polymer of this invention can be alone or in admixture with one or more similar or different polymers, reinforcing and nonreinforcing fillers and extenders, colorants including pigments and the like, plasticizers, stabilizers including antioxidants, ultraviolet light inhibitors, heat stabilizers, and the like, antistatic agents, mold release agents, and the like.

This invention in other aspect comprises a process for making a graft polymer product consisting essentially of the foregoing graft polymer. In summary, this process comprises effecting graft reaction of (1) starting polyether polymer material, and (2) graft monomer material with catalyst material.

The starting polyether polymer material of this invention consists essentially of at least one starting polyether polymer. Under the concepts of this invention, this is a branched polyether polymer wherein at least one of the monomer units in the polyether chain has a branch with at least one reactive halo radical. While under the broad concepts of this invention the starting branched polyether polymer need have only one monomer unit with a reactive halo-substituted branch, usually more than one such unit is present, in some embodiments these units being the same, in other embodiments these units being different. In some embodiments of the process of this invention the starting polyether polymer material comprises only one starting branched polyether polymer. In other embodiments it comprises more than one starting branched polyether polymer, two, three, or more such polymers being employed.

A preferred starting polyether polymer is one having at least one recurring monomer unit according to the formula (III):

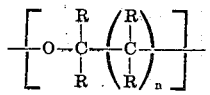

where n is 1-3, each R is selected independently of each other, except as indicated hereinafter, from the group consisting of the hydrogen radical, the alkyl, alkoxyalkyl, alkenyl, alkenyloxyalkyl, aryl, aryloxyalkyl, alkylaryloxyalkyl, alkenylaryloxyalkyl, cycloalkyl, alkylcyloalkyl, alkenylcycloalkyl, cycloalkenyl, alkylcycloalkenyl, cycloalkyloxyalkyl, alkylcycloalkyloxyalkyl, and alkenylcycloalkyloxyalkyl radicals, the halo-substituted, alkyl, alkoxyalkyl, alkenyl, alkenyloxyalkyl, cycloalkyl, alkylcycloalkyl, alkenylcycloalkyl, cycloalkenyl, alkylcycloalkenyl, cycloalkyloxyalkyl, alkylcycloalkyloxyalkyl, and alkenylcycloalkyloxyalkyl radicals, the halo-substituted, aryloxyalkyl, alkylaryloxyalkyl and alkenylaryloxyalkyl radicals wherein the halo-substitution is only in the nonaromatic portions of said radicals, and unsubstituted and halo-substituted cyclic organic structures comprising one of the other R's, at least one of the R's being a halo-substituted radical. While these radical can contain any number of carbon atoms, usually the alkyl portion has one to 100 carbon atoms, preferably one to 200 carbon atoms, the alkenyl portion has two to 100 carbon atoms, preferably two to 20 carbon atoms, the cycloalkyl and cycloalkenyl portions have three to 100 carbon atoms, preferably three to 20 carbon atoms, and the aryl portions have six to 18 carbon atoms. Specific examples of starting polyether polymers according to formula III include the amorphous and crystalline homopolymers of haloalkylene oxides such as
epifluorohydrin,
epichlorohydrin,
epibromohydrin, and
epiiodohydrin,
2-methyl-3-chloro-1,2epoxypropane,
1,2-dichloro-3,4-epoxypropane,
1-chloro-3,4epoxybutane,
1-chloro-4,5-epoxypentane
1,1-dichloro-2,3-epoxypropane,
1,1,1-trichloro-2,3-epoxypropane,
1,1,1-trichloro-3,4-epoxybutane,
1,1,1-trifluoro-2,3-epoxypropane,
cis-1,4-dichloro-2,3-epoxybutane,
trans-1,4-dichloro-2,3-epoxybutane, and the like.
haloalkyl glycidyl ethers such as
2,2-bis (chloromethyl) ethyl glycidyl ether,
2,-chloroethyl glycidyl ether,
2-bromoethyl glycidyl ether,
2-chloro-1glycidyl ether,
2,2,2-tris(chloromethyl) ethyl glycidyl ether, and the like,
haloalkylaryl glycidyl ethers such as
chloromethylphenyl glycidyl ether,
chloromethylnaphthyl glycidyl ether, and the like,
haloalkyl and haloalkoxy oxetanes such as
2-chloromethyl oxetane,
2-β-bromethyl oxetane,
2-fluoromethyl oxetane,
2-trifluoromethyl oxetane,
2-γ-iodopropyl oxetane,
2-β-chlorobutyl oxetane,
2-fluoromethoxy oxetane,
2-chloromethoxy oxetane,
2bromomethoxy oxetane,
2-iodome oxetane,
2-β-chloroethoxy oxetane,
2-β-bromobutoxy oxetane,
2-β-fluorooctoxy oxetane,
2-fluoromethoxy methyl oxetane,
2β-chloroethoxy methoxy oxetane,
2-γ-bromoisopropoxy methyl oxetane,
2-γ-iodobutoxy methyl oxetane,
2-fluorohexoxy methyl oxetane,
2-ω-chlorodecoxy methyl oxetane,
3-β-bromoethyl oxetane,
3β-iodomethyl oxetane,
3-trifluoromethyl oxetane,
3β-iodopropyl oxetane, 3β-chlorobutyl oxetane,
3,3-bis(chloromethyl) oxetane,
3,3-bis(fluoromethyl) oxetane,
3,3-bis(iodomethyl) oxetane,
3,3-bis(bromomethyl) oxetane,
3,-fluoromethoxy oxetane,
3,-chloromethoxy oxetane,
3-bromomethoxy oxetane,
3-iodomethoxy oxetane,
3-β-chloroethoxy oxetane,
3-ω-bromobutoxy oxetane,
3-βfluorooctoxy oxetane,
3-fluoromethoxy methyl oxetane,
3-β-chloroethoxy methyl oxetane,
3-β-bromoisopropoxy methyl oxetane,
3-ω-iodobutoxy oxetane,
3-ω-fluorohexoxymethyl oxetane,
3-ω-chlorodecoxy methyl oxetane, and the like,
halo-tetrahydrofuranes such as
3-(β-chloroethyl)-tetrahydrofuran,
2-trifluoromethyltetrahydrofuran,
2,3,4-tris(trifluoromethyl)-tetrahydrofuran, and the like, and
halo-substituted aldehydes such as
chloroacetaldehyde,
chloral,
trifluoroacetaldehyde, and the like, and the like. Specific examples of starting polyether polymers according to formula III also include normally solid amorphous and crystalline copolymers, terpolymers, etc., of the foregoing halo-substituted monomers with each other, as well as of the foregoing halo-substituted monomers with copolymerizable monomers, examples of which comprise alkylene oxides such as
ethylene oxide,
propylene oxide,
1-butene oxide,
cis-2-butene oxide,
trans-2-butene oxide,
isobutylene oxide,
1-hexene oxide,
and the like,
cycloaliphatic oxides such as
cyclohexene oxide,
vinyl cyclohexene oxide,
vinyl cyclohexene dioxides,
cyclooctene oxide,
and the like,
arylalkylene oxides such as
styrene oxide,
and the like,
alkenylalkylene oxides such as
butadiene monoxide,
and the like,
alkyl glycidyl ethers such as
methyl glycidyl ether, ethyl glycidyl ether,
methylethyl glycidyl ether,
isopropyl glycidyl ether,
t-butyl glycidyl ether,
and the like,
aryl glycidyl ethers and haloaryl glycidyl ethers, such as
phenyl glycidyl ether,
naphthyl glycidyl ether,
glycidyl ether of bisphenol,
p-chlorophenyl glycidyl ether,
o-chlorophenyl glycidyl ether,
and the like,
alkenyl glycidyl ethers such as
allyl glycidyl ether,
and the like,
alkenyl aryl glycidyl ethers such as o-allylphenyl glycidyl ether,
p-crotylphenyl glycidyl ether,
and the like,
oxetanes such as
oxetane (also known as trimethylene oxide),
2-methyloxetane,
2-ethyloxetane,
2-butyloxetane,
2-octyloxetane,
2-methoxyoxetane,
2-ethoxyoxetane,
2-propoxyoxetane,
2-hexoxyoxetane,
2-methoxymethyloxetane,
2-ethoxymethyloxetane,
2-butoxymethyloxetane,
2-decoxymethyloxetane,
3-methyloxetane,
3-ethyloxetane,
3-propyloxetane,
3-butyloxetane,
3-octyloxetane,
3-methoxyoxetane,
3-ethoxyoxetane,
3-propoxyoxetane,
3-hexoxyoxetane,
3-methoxymethyloxetane,
3-ethoxymethyloxetane,
3-butoxymethyloxetane,
3-decoxymethyloxetane,
3, 3-dimethyloxetane,
3, 3-diethyloxetane,
3, 3-dipropyloxetane,
3, 3,-diisopropyloxetane,
3, 3-dibutyloxetane,
3, 3-dioctyloxetane,
3-methyl-3-ethyloxetane,
3-methyl- 3-propyloxelane,
3-ethyl-3-butyloxetane,
3-isopropyl- 3-propyloxetane,
3-butyl-3-methyloxetane,
3-propyl-3
and the -hexyloxetane, like, tetrahydrofuranes such as
tetrahydrofuran,
2-methyltetrahydrofuran,
2, 3, 2-trimethyltetrahydrofuran,
and the like,
alkanals such as
formaldehyde,
acetaldehyde,
propionaldehyde,
n-butyraldehyde,
isobutyaldehyde,
pivalaldehyde,
hexanal,
octanal,
methoxyacetaldehyde,
3-ethoxypropionaldehyde,
and the like,
alkenals
acrolein,
methacrolein,
crotonaldehyde,
and the like,
heterocyclic aldehydes such as
furfural,
and the like,
and the like. Especially preferred are the halo-substituted polyether polymers disclosed and claimed in the U.S. Pat, Nos. 3,058,922, 3,065,188, 3,135,705, 3,158,580 3,158,581, 3,158,591, 3,214,390, 3,275,573, 3,285,862, 3,311,570 and 3,341,475, to Vandenberg.

As a practical matter, most embodiments of the process of this invention comprise a starting polyether polymer having at least one recurring monomer unit with at least one reactive halo-substituted branched. In these embodiments the total number of monomer units with at least one reactive halo-substituted branch constitutes at least about 1 percent of the total number of monomer units present in the polymer, preferably about 5 percent of the total number of monomer units present in the polymer, and up to 100 percent of the total number of monomer units in the polymer.

The graft monomer material of this invention consists essentially of 2-cyanoethyl, least one free radically polymerizable ethylenically unsaturated compound. Such a compound is referred to hereinafter as a graft monomer. In some embodiments of the process of this invention, the graft monomer material comprises only one such monomer. In other embodiments it comprises two or more such monomers. Examples of such monomer include such vinylidene and vinylene monomers as, for instance, styrene, alkyl-substituted styrenes such as alpha-methylstyrene and the like, monoolefins and diolefins such as, for instance, ethylene, propylene, butene-1,butadiene, and the like, unsaturated acids such as acrylic acid, methacrylic acid, maleuric acid, and the like, esters of unsaturated acids such as, for instance, the methyl, ethyl, butyl, hydroxyethyl, 2-cyanoethyl, and the like, esters of acrylic acid, methacrylic acid, alpha-chloroacrylic acid and the like, salts of these acids, such as, for example, sodium acrylate, lithium methacrylate, potassium acrylate, calcium acrylate, and the like, unsaturated nitriles, such as, for instance, acrylonitrile, methacrylonitrile, alpha-chloroacrylonitrile, and the like, unsaturated halides such as, for instance, vinyl chloride, vinyl fluoride, vinylidene chloride, vinylidene fluoride and the like, vinyl esters such as, for instance, vinyl acetate, vinyl propionate, and the like, vinyl pyridine, vinyl ethers, vinyl sulfonic acid and its salts (for instance, magnesium vinyl sulfonate and the like), allyl compounds like allyl acetate, allyl alcohol, allyl chloride, methallyl chloride, methallyl acetate, allyl amine, etc., fumaric acid, salts of fumaric acid (potassium fumasate), diethyl maleate, dimethyl fumarate, cis and trans muconic acids, maleic anhydride, acrylamide, diethylaminoacrylamide, itaconic acid, itaconic anhydride, maleimide, N-methyl maleimide, N-carbamyl-maleimide, pentamethyl disiloxane methyl methacrylate, methacryloxypropyltrimethoxy-silane, diethylaminoethylacrylate, and the like. Especially preferred graft monomers are acrylic acid, methyl methacrylate, dimethylaminoethyl methacrylate, acrylonitrile, vinyl acetate, acrylamide and maleic anhydride.

The quantity of graft monomer material employed in the process of this invention is within a broad range. It depends upon the number of graft monomer units desired in the graft polymer product and upon the reaction conditions. However, in general, the quantity is such as to provide a mol ratio of graft monomer units to reactive halo-substituted branches in the starting polyether polymer material in a range from about 0.005:1 to about 2.00:1, and preferably in a range from about 0.01:1 to about 100:1.

The catalyst material employed in the process of this invention consists essentially of a transition metal-labile ligand complex with the transition metal portion of the complex being in a valence state less than its maximum valence state. In some embodiments, the catalyst material comprises just one such complex. In other embodiments, however, it comprises two or more such complexes. A transition metal-labile ligand complex is a chemical compound having a transition metal portion chemically attached to a labile ligand portion. The transition metal portion in some embodiments of the process of this invention comprises only one transition metal. In other embodiments it comprises two or more transition metals, in some instances in a metal to metal plus labile ligand chemical attachment and in other instances chemically attached only through a labile ligand. Specific examples of transition metals employed in the catalyst complexes of this invention include titanium, Vanadium,
molybdenum,
iron,
tungsten,
nickel,
rhenium,
cobalt,
chromium,
ruthenium,
and the like.

Preferably, each transition metal present in the complex is in a zero valence state. The labile ligand portion of the complex comprises at least one labile ligand. In some embodiments, it comprises only one labile ligand. In other embodiments, it comprises two or more labile ligands. A labile ligand is a group capable of chemical linkage or attachment to a transition metal in a valance state less than its maximum to form with the metal a complex that interacts with reactive halo-substituted groups to give free radicals. Specific examples of labile ligands include carbonyl,
isocyanide,
phenyl isocyanide,
alkyl phosphite,
aryl phosphite,
tertiary amines (for instance, pyridine),
phosphines,
nitrosyls, and like organic groups. Specific examples of transition metal-labile ligand complexes under the concepts of this invention include those complexes represented by the following formulas wherein Φ means phenylene, Cp stands for cyclopentadienyl, Et means ethyl, and Me stands for methyl;

$Mo(CO)_6$, $Mn(CO)_4$, $Fe(CO)_5$, $W(CO)_6$, $Ni(CO)_4$, $Mn_2(CO)_{10}$, $Re_2(CO)_{10}$
$CpV(CO)_4$, $Cp_2Ti(CO)_2$, $Co_4(CO)_{12}$, $Cr(CO)_6$,
$(\phi_2PCH_2CH_2P\phi_2)Ni(CO)_2$, $Ru(CO)_2(P\phi_3)_2Cl_2$, $Ni[(EtO)_3P]_4$
$\phi COCpMn(CO_3)$, $C_6H_6Cr(CO)_3$, $H_2Fe[(EtO)_3P]_4$
$Ni(CO)_2(P\phi_3)_2$, $(CO)_5Mo\text{—}PMe_2PMe_2\text{—}Mo(CO)_5$

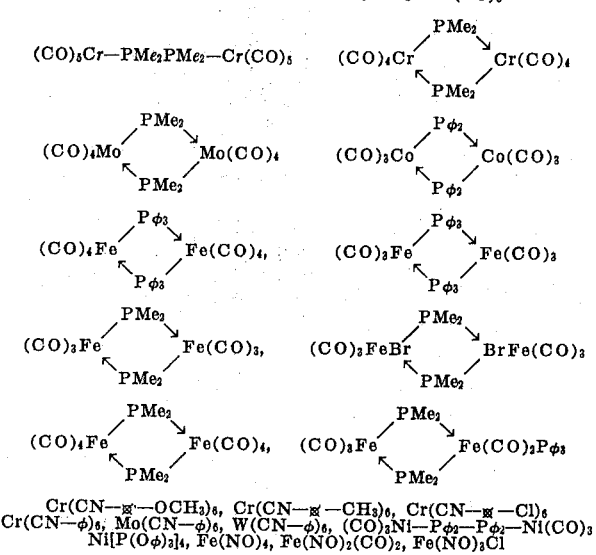

$Cr(CN\text{—}\text{₈}\text{—}OCH_3)_6$, $Cr(CN\text{—}\text{₈}\text{—}CH_3)_6$, $Cr(CN\text{—}\text{₈}\text{—}Cl)_6$
$Cr(CN\text{—}\phi)_6$, $Mo(CN\text{—}\phi)_6$, $W(CN\text{—}\phi)_6$, $(CO)_3Ni\text{—}P\phi_2\text{—}P\phi_2\text{—}Ni(CO)_3$
$Ni[P(O\phi)_3]_4$, $Fe(NO)_4$, $Fe(NO)_2(CO)_2$, $Fe(NO)_2Cl$ and the like.

The quantity of graft monomer material reacted with the polyether polymer material is within a broad range. It depends upon the number of reactive halo substituents in the polyether polymer material, the number of graft monomer units desired in the graft polymer product, and the reaction conditions. However, in general the quantity is such as to provide a mole ratio of graft monomer units to reactive halo-substituted branch monomer units in the polyether polymer material in a range from about 0.005:1 to about 2100:1, and preferably in a range from about 0.001:1 to about 100:1.

The quantity of catalyst material employed in the process of this invention is a catalytic or effective quantity. Such a quantity is present generally in a range from about 0.0001 to about 10 percent by weight of the starting polyether material, preferably in a range from about 0.0001 to about 2 percent by weight of the starting polyether polymer material and usually in a range from about 0.001 to about 1 percent by weight of the starting polyether polymer material. However, operable higher and lower concentrations are within the broader concepts of this invention.

To effect with catalyst material graft reaction by the starting polyether polymer material of this invention and graft monomer material, the catalyst material, starting polyether polymer material and the graft monomer material are admixed. This step is performed by conventional ways and means. For instance, it is done by bulk polymerization procedures, solution polymerization procedures, emulsion polymerization procedures, suspension polymerization procedures, or the like. In one embodiment, it is performed during the formation of a shaped article from the starting polyether polymer material and graft monomer material. It is done in some embodiments on a batch basis and in other embodiments on a continuous basis.

The graft reaction that takes place upon admixing of the polyether polymer material, graft monomer material and catalyst material is thermally activated in some embodiments, light activated in other embodiments, and both thermally and light activated in still other embodiments. In this connection, the admixing step is performed in a wide temperature range, a general range being from about −50° to about 250° C., and a preferred range being from about 0° to about 180° C. When light activation is employed, however, substantially lower temperatures preferably are used as compared to temperatures employed in thermal activation alone.

The admixing step is performed in a wide range of ambient pressures from subatmospheric to superatmospheric. In many embodiments involving a volatile graft monomers, superatmospheric pressure is preferably employed.

In the practice of some embodiments of the process of this invention it is possible for graft monomer material to cross-link the starting polyether polymer material. In some cases this is desirable, particularly when a solvent resistant graft polymer product is desired. In such cases, and admixing step can be carried out by emulsion polymerization or suspension polymerization procedures, for example, in aqueous emulsion. In other cases, such cross-linking results in a graft polymer product of undesired hardness, toughness and resistance to solvents. In such instances, preferably the polymerization reaction mixture also comprises retarder material. This is material composed of one or more compounds which minimize cross-linking. In general, the efficacy of such compounds depends to a large extent upon the composition of the free radically polymerizable ethylenically unsaturated monomer material. In this regard, a retarder for vinyl acetate polymerization does not necessarily work for methyl methacrylate polymerization. However, examples of compounds which minimize cross-linking by one or more graft monomers include aliphatic and aromatic nitro compounds such as, for example, nitrobenzene, and the like, quinone, hydroquinone, phenols, olefins, terpenes, aldehydes, aromatic hydrocarbons, aliphatic and aromatic amines, allyl compounds, sulfur compounds such as mercaptans, sulfides and disulfides, organic halides, and the like.

Concentration of retarder material when such is employed, likewise is in a broad range. Generally it is in a range from about 0.001 percent by weight to about five times the weight of the graft monomer material, and preferably in a range from about 0.01 to about 100 percent by weight of the graft monomer material. However, higher and lower operable concentrations are within the broader concepts of this invention.

The best mode now contemplated of carrying out this invention is illustrated by the following examples of specific embodiments of this invention. This invention is not limited to these specific embodiments.

In the examples, all parts and percentages are by weight unless otherwise indicated.

Also, in the examples typical RSV values are reported. RSV is an abbreviation of Reduced Specific Viscosity ($\eta sp/c$). These values are determined with the aid of a conventional Ubbelohde viscometer and a 0.1 percent solution of the polymer in a solvent at a specific temperature. In all examples except example 23, the solvent is alpha-chloronaphthalene containing acetylacetone at a 3 percent concentration, and the temperature is 100° C. In example 24, the solvent is dimethylformamide and the temperature is 25° C. Typical RSV values are set forth because the reduced specific viscocity of a polymer is a function of its molecular weight.

The graft monomer material in these examples is distilled methyl methacrylate. The quantity charged to the reactor in each example is 10 parts.

The composition and quantity of the catalyst material in each example are indicated in the following table I, the nomenclature used being that employed in the preceding discussion of catalyst material.

In each example the reaction temperature is 65° C. and the reaction period is 66 hours.

Typical RSV values, chlorine analyses, and appearances of the graft polymer products of these examples are summarized in table I.

TABLE I

| Example No. | Catalyst material | Catalyst material concentration [1] | Isolated graft polymer product | | |
|---|---|---|---|---|---|
| | | | RSV | Percent Cl | Product Decsription |
| 1 | $Fe(CO)_5$ | 0.033 | 3.6 | 12.4 | Very tough, hard, white polymer. |
| 2 | $Fe(CO)_5$ | 0.33 | 3.5 | 16.4 | Very tough, white rubbery polymer. |
| 3 | $Fe(CO)_5$ | 1.7 | 2.3 | 24.5 | Snappy rubber. |
| 4 | $(\phi_2PCH_2CH_2P\phi_2)Ni(CO)$ | 1.7 | 4.2 | 18.4 | Very tough, white rubber. |
| 5 | $Ru(CO)_2(P\phi_3)_2Cl_2$ | 1.7 | 3.5 | 18.5 | Very tough, rubbery polymer. |
| 6 | $Ni[(EtO)_3P]_4$ | 1.7 | 4.4 | 15.7 | Very tough, rubbery polymer with slow recovery. |
| 7 | $\phi COCpMn(CO)_3$ | 1.7 | 2.9 | 16.4 | Tough rubber. |
| 8 | $C_6H_6Cr(CO)_3$ | 1.7 | 3.1 | 19.2 | Rubbery. |
| 9 | $H_2Fe[(EtO)_3P]_4$ | 1.7 | 3.4 | 16.5 | Tough rubber. |
| 10 | $Ni(CO)_2(P\phi_3)_2$ | 0.17 | 4.2 | 23.4 | Soft, white rubber. |
| 11 | $Ni(CO)_2(P\phi_3)_2$ | 0.33 | 4.0 | 21.7 | Soft, white rubber. |
| 12 | $Mn(CO)_4$ | 1.7 | 4.2 | 15.3 | Very tough rubber. |
| 13 | $Mo(CO)_6$ | 0.017 | 3.3 | 16.5 | Tough, rubbery polymer. |
| 14 | $Mo(CO)_6$ | 0.033 | 3.9 | 13.0 | Very hard, tough rubber. |
| 15 | $Mo(CO)_6$ | 0.17 | 3.5 | 15.4 | White, rubbery polymer. |
| 16 | $Mo(CO)_6$ | 0.33 | 391 | 20.2 | Soft, rubbery polymer. |
| 17 | $Mo(CO)_6$ | 5.6 | 3.5 | 16.3 | Tough rubber. |

[1] Percent of starting polyether.

EXAMPLES 1–17

These examples illustrate specific graft polymers of this invention made from methyl methacrylate and starting polyether polymer material consisting essentially of a copolymer of epichlorohydrin and ethylene oxide, and the syntheses of these graft polymers.

In each of these examples, the procedure for making these graft polymers is as follows: A clean polymerization reactor is changed with liquid reaction medium starting polyether polymer material and graft monomer material under a nitrogen atmosphere at 15 pounds per square inch gauge pressure. While agitating the resulting mixture, it is established at a designated temperature, and then charged with catalyst material. The reaction mixture thus formed is agitated for a designated period of time at the designated temperature. Then a solution (0.3 part per part of starting polyether polymer material) of 2,5-di-t-amyl hydroquinone (1 percent) and water is added to the reaction mixture to stop further reaction.

In each of these examples, a graft polymer product is separated from the reaction mixture as follows: 1,1,3-tris (2-methyl-4-hydroxy-5-t-butylphenyl)butane referred to herein as TCA, (five parts per 1000 parts of polymer product), dissolved in benzene is admixed with the reaction mixture. Heptane (100–200parts) containing TCA (three parts per 10,000 parts of heptane) is then admixed, causing a precipitate to form. The precipitate is removed from the mixture by filtration, the filter cake is washed twice with heptane containing TCA (three parts per 10,000 parts of heptane), and then placed for 16 hours at 80° C. in a vacuum oven to remove residual heptane. The solids that remain are graft polymer product.

In each one of these examples, the liquid reaction medium is reagent grade benzene and the quantity used is 44 parts.

The starting polyether polymer material used in these examples is free of any phenolic antioxidant. It consists essentially of a copolymer of epichlorohydrin and ethylene oxide, the epichlorohydrin content of which typically is 68 percent, the RSV of which typically is 4.3, and the ash content of which is usually about 0.4 percent. The quantity of starting polyether polymer material in each case charged to the reactor is three parts, except in example 17 where 0.9 part is used.

Each of the graft polymer products of these examples is useful as a material of construction for shaped articles. If desired, these products can be filled, cross-linked, or both filled and cross-linked with known cross-linking agents for epihalohydrin polymers.

EXAMPLES 18–24

These examples illustrate specific graft polymers of this invention made from various starting polyether polymers and free radically polymerizable vinyl monomers, and the syntheses of these graft polymers.

The graft reaction procedure and graft polymer product isolation procedure employed in these examples are the same as described in examples 1–17. In example 18, however, the graft polymer product is further treated by extracting with water to remove any graft monomer and ungrafted polymerized graft monomer and then dried.

The liquid reaction medium employed in these examples is reagent grade benzene (44 parts).

The starting polyether polymer material employed in each of these examples consist of essentially of the copolymers in examples 18–22 and the terpolymer in example 23, which are identified in the following table II by abbreviations of the monomers from which they are made and the relative percentages of monomer units in the polymers. The abbreviations and corresponding monomers are:

ECH = epichlorohydrin
EO = ethylene oxide
TEB = 1,1,1-trichloro-3,4-epoxybutane

Typical RSV values for these polymers are also given. The quantity of starting polyether polymer used in each of examples 18 and 19 is 3.0 parts, while the quantity in each of examples 10–23 is 3.3 parts. In each case the starting polyether polymer is free of any phenolic antioxidant.

The graft monomer material in each example consisting essentially of the graft monomer listed for that example in table II. The quantity of graft monomer material used in each case is 10 parts.

The catalyst material in each of these examples consists essentially of $Mo(CO)_6$. The quantity of catalyst material used in each example is 0.05 part.

In examples 18–22, the reaction mixture is established and maintained at 65° C. for 66 hours. However, in example 23, the reaction mixture is established and maintained at 65° C. for 16 hours, then at 20–25° C. for 7 hours, and finally at 80° C. for 17 hours.

The RSV value, chlorine analysis, and appearance of the graft polymer product of each example are summarized in table II.

TABLE II

| Example No. | Polyether | RSV | Monomer | Catalyst | Isolated polymer product ||| 
|---|---|---|---|---|---|---|---|
| | | | | | RSV | Percent Cl | Product description |
| 18 | 75% ECH:25% EO | 3.9 | Acrylamide | Mo(CO)$_6$ | 1.8 | 16.7 | Somewhat extensible solid. |
| 19 | 75% ECH:25% EO | 3.9 | Styrene | Mo(CO)$_6$ | 4.0 | 24.0 | Soft rubber. |
| 20 | 75% ECH:25% EO | 3.9 | Acrylonitrile | Mn(CO)$_4$ | 2.7 | 19.8 | Soft, white rubber. |
| 21 | 100% ECH | 2.3 | Methyl methacrylate | Mo(CO)$_6$ | 2.0 | 33.6 | Rubber. |
| 22 | 42% ECH:58% EO | 2.3 | ...do... | Mo(CO)$_6$ | 1.7 | 12.4 | Slightly tacky, rubbery polymer. |
| 23 | 23% ECH:77% EO | 1.7 | ...do... | Mo(CO)$_6$ | 0.95 | 6.5 | Soft, clear rubber. |
| 24 | 66% ECH:25% EO:9% TEB | 4.5 | ...do... | Mo(CO)$_6$ | [1] 4.6 | 13.2 | Tough rubber. |

[1] DMF.

Each of the graft polymer products of these examples is useful as a material of construction for shaped plastic articles. If desired, each of the graft polymer product of these examples can be filled, cross-linked, or both filled and cross-linked with known cross-linking agents for epihalohydrin polymers.

Hence, this invention provides a new and useful graft polymer, and a process for making it.

Other features, advantages of specific embodiments of this invention will be readily apparent to those exercising ordinary skill in the art after reading the foregoing disclosures. These specific embodiments are within the scope of the claimed subject matter. While specific embodiments of this invention have been described in the foregoing disclosures in considerable detail, variations and modifications of these embodiments can be effected without departing from the spirit and scope of the invention as disclosed and claimed.

What I claim and desire to protect by Letters Patent is:

1. A graft polymer of a branched polyether polymer containing at least 1 mole percent of a monomer unit having at least one halo-substituted branch radical selected from the group consisting of halo-substituted hydrocarbon, halo-substituted hydrocarbon-oxy and halo-substituted hydrocarbon-oxyhydrocarbon radicals, wherein at least one graft has replaced at least one halogen of said halo-substituted branch radical, which graft is composed of at least one free radically polymerizable ethylenically unsaturated monomer unit.

2. A graft polymer according to claim 1, wherein said graft comprises a plurality of free radically polymerizable ethylenically unsaturated monomer units.

3. A graft polymer according to claim 2, wherein said monomer unit having at least one halo-substituted branch radical is an epihalohydrin monomer unit.

4. A graft polymer according to claim 3, wherein said free radically polymerizable ethylenically unsaturated monomer units comprise methyl methacrylate monomer units.

5. A graft polymer according to claim 3, wherein said branched polyether polymer comprise another recurring monomer unit having the oxy-carbon skeleton structure of the oxyethylene unit.

6. A graft polymer according to claim 5, wherein said free radically polymerizable ethylenically unsaturated monomer units comprise methyl methacrylate monomer units.

7. A graft polymer according to claim 5, wherein said free radically polymerizable ethylenically unsaturated monomer units comprise styrene monomer units.

8. A graft polymer according to claim 5, wherein said free radically polymerizable ethylenically unsaturated monomer units comprise acrylonitrile monomer units.

9. A graft polymer according to claim 6, wherein said branched polyether polymer comprises another recurring monomer unit having the oxy-carbon skeleton structure of the oxybutylene unit.

10. A process for making a graft polymer, which comprises: effecting reaction of (1) a polyether polymer having a reactive halo-substituted branch radical selected from the group consisting of halo-substituted hydrocarbon, halo-substituted hydrocarbon-oxy and halo-substituted hydrocarbon-oxyhydrocarbon radical with (2) free radically polymerizable ethylenically unsaturated monomer material by contacting a mixture of (1) and (2) in a mole ratio of 1:0.005 to 1:400, respectively, at a temperature of from about −50° C. to about 250'0 C., with at least a catalytic amount of a catalyst material comprising a transition metal-labile ligand complex in which the transition metal portion is in a valence state less than its maximum valence state.

11. A process according to claim 10, wherein said catalyst material comprises Mo(Co)$_6$.

12. A process according to claim 10, wherein said catalyst material comprises Mo(CO)$_4$.

13. A process according to claim 10, wherein said catalyst material comprises Fe(CO)$_5$.

14. A process according to claim 10, wherein said polyether polymer comprises epichlorohydrin monomer units.

* * * * *

PO-1050
(5/69)

UNITED STATES PATENT OFFICE
CERTIFICATE OF CORRECTION

Patent No. __U.S.P. 3,627,839__    Dated __December 14, 1971__

Inventor(s) __Edwin J. Vandenberg (Case 126)__

It is certified that error appears in the above-identified patent and that said Letters Patent are hereby corrected as shown below:

Col. 3, Line 26 of p.p.; Page 6, Line 18 of spec.
"200"   --- should read --- "20"

Col. 3, Line 52 of p.p.; Page 7, Line 13 of spec.
"2-chloro-1 glycidyl ether" --- should be --- "2-chloro-1-methylethyl glycidyl ether"

Col. 3, Line 59 of p.p.; Page 7, Line 22 of spec.'
"2-β-bromethyloxetane" --- should be --- 2-β-bromoethyloxetane --.

Col. 3, Line 67 of p.p.; Page 7, Line 30 of spec.
"2-iodome oxetane" --- should be --- "2-iodomethoxy oxetane"

Col. 5, Line 38 of p.p.; Page 10, Line 8 of spec.
"3-methyl-3-propyloxelane" --- should be --- "3-methyl-3-propyloxetane"

Col. 5, Line 47 of p.p.; Page 10, Line 17 of spec.
"2,3,2-trimethyltetrahydrofuran" --- should be --- "2,3,4-trimethyltetrahydrofuran"

Col. 6, Line 12 of p.p.; Page 11, Line 7 of spec.
"2-cyanoethyl"  --- should be --- "of at ""

Col. 6, Line 40 of p.p.; Page 11, Line 32 of spec.
"fumasate"  --- should be --- "fumarate"

PO-1050
(5/69)

UNITED STATES PATENT OFFICE
CERTIFICATE OF CORRECTION

Patent No. __U.S.P. 3,627,839__     Dated __December 14, 1971__

Inventor(s) ____Edwin J. Vandenberg (Case 126)____     PAGE - 2

It is certified that error appears in the above-identified patent and that said Letters Patent are hereby corrected as shown below:

Col. 6, Line 57 of p.p.; Page 12, Line 15 of spec.
  "2.00:1"  --- should be --- "400:1"

Col. 7, Line 32 of p.p.; Page 13, Line 28 of spec.
  "wherein ......cyclopenta-"   --- should read ---
  "wherein ∅ means phenyl, ⌧ means phenylene, Cp stands for cyclopenta-"

Col. 9 and 10 of p.p.; Pagen 20 of spec.
  IN TABLE I, under RSV, across from Example 16
  "391"   --- should be --- "3.1"

Col. 7, Line 71 of p.p.; Page 15, Line 18 of spec.
  "2100:1"   --- should be --- "400:1"

Col. 7, Line 72 of p.p.; Page 15, Line 18 of spec.
  "0.001"   --- should be --- "0.01:1

Col. 10, Line 66 of p.p.; Page 21, Line 31 of spec.
  "10-23"   --- should be --- "20-23"

Col. 12, Line 42, of p.p.; Page 25 of spec. - Claim 10, Line 9
  " 250'c."   --- should be --- "250°C."

Signed and sealed this 4th day of July 1972.

(SEAL)
Attest:

EDWARD M. FLETCHER, JR.
Attesting Officer

ROBERT GOTTSCHALK
Commissioner of Patents